United States Patent [19]
Yun

[11] Patent Number: 5,731,924
[45] Date of Patent: Mar. 24, 1998

[54] TRACK FOLLOWING METHOD BY USING OFF-TRACK AND ON-TRACK OFFSET ADJUSTING METHOD IN MAGNETIC DISK DRIVING DEVICE

[75] Inventor: Jong-Yun Yun, Suwon, Rep. of Korea

[73] Assignee: SamSung Electronics Co., Ltd., Suwon, Rep. of Korea

[21] Appl. No.: 529,246

[22] Filed: Sep. 15, 1995

[30] Foreign Application Priority Data

Oct. 27, 1994 [KR] Rep. of Korea ............... 27717/1994

[51] Int. Cl.$^6$ ............................................. G11B 21/10
[52] U.S. Cl. ............................ 360/77.08; 360/77.01
[58] Field of Search ............................ 360/77.08, 77.07, 360/77.11, 75, 76, 77.01, 77.06, 109, 78.09, 78.07, 77.04

[56] References Cited

U.S. PATENT DOCUMENTS

| | | |
|---|---|---|
| 4,458,274 | 7/1984 | Charlson et al. ............. 360/76 |
| 4,977,470 | 12/1990 | Murayama et al. . |
| 5,065,263 | 11/1991 | Yoshida et al. . |
| 5,166,842 | 11/1992 | Albert et al. . |
| 5,187,620 | 2/1993 | Notake et al. . |
| 5,210,662 | 5/1993 | Nishijima . |
| 5,241,433 | 8/1993 | Anderson et al. . |
| 5,270,885 | 12/1993 | Satoh et al. . |
| 5,315,454 | 5/1994 | Fukakusa ............... 360/75 |
| 5,321,564 | 6/1994 | Takahashi et al. . |
| 5,333,083 | 7/1994 | Nakano . |
| 5,333,084 | 7/1994 | Galloway et al. ........... 360/77.08 |
| 5,347,410 | 9/1994 | Narita et al. . |
| 5,396,380 | 3/1995 | Shiomizu et al. .......... 360/77.08 X |
| 5,426,544 | 6/1995 | Narita et al. . |
| 5,457,587 | 10/1995 | Suzuki ................... 360/77.04 |
| 5,473,550 | 12/1995 | Cameron et al. ........... 360/78.09 |

*Primary Examiner*—Thang V. Tran
*Assistant Examiner*—K. Wong
*Attorney, Agent, or Firm*—Robert E. Bushnell, Esq.

[57] ABSTRACT

A method for following and reading data from a corresponding track on a magnetic disk has two embodiments. Under the first embodiment, an on-track offset value is adjusted upwardly and downwardly in an alternating manner, wherein each successive adjustment increases or decreases by a predetermined step value. Under the second embodiment, maximum and minimum values for the on-track offset value are determined by incrementing the on-track offset value upwardly and downwardly, respectively, an average value based on these maximum and minimum on-track offset values is computed, and the average value is designated as an initial on-track offset value.

13 Claims, 5 Drawing Sheets

TRACK FOLLOWING METHOD BY USING OFF-TRACK AND ON-TRACK OFFSET ADJUSTING METHOD IN MAGNETIC DISK DRIVING DEVICE

CROSS-REFERENCE TO RELATED APPLICATIONS

This application makes reference to, incorporates the same herein, and claims all benefits accruing under 35 U.S.C. §119 from an application for *Track Following Method By Using Off-Track And On-Track Offset Adjusting Method In Magnetic Disk Driving Device* earlier filed in the Korean Industrial Property Office on 27 Oct. 1994 and there assigned Ser. No. 27717/1994.

BACKGROUND OF THE INVENTION

The present invention relates to a magnetic disk driving device for magnetically writing and reading digital information, and more particularly, to a method for following a corresponding track to read data from the track on a magnetic disk surface.

A magnetic disk driving device for magnetically writing and reading data on a rotary magnetic disk can access a large amount of data at a high speed, and thus, it is widely used as an auxiliary memory of a computer system. In the magnetic disk driving device, data is stored in tracks which extend radially along the magnetic disk surface. These tracks are accessed by a magnetic head (or a data transducer) for reading, writing and erasing data on the magnetic disk.

The magnetic head is moved in a radial direction along the magnetic disk surface under the control of a head position servo mechanism capable of positioning the magnetic head on any one selected track. In order to selectively position the magnetic head at a specific track, a current track position of the magnetic head should be monitored.

Servo information indicative of the head position on tracks is provided by using a specific servo pattern which is read from the magnetic disk surface by the magnetic head. The servo pattern is permanently written on the magnetic disk surface after to assembly of the magnetic disk driving device. When accessing data on the magnetic disk surface, the servo pattern is detected by the magnetic head and used as track position information. An embedded servo method is an example of a method that provides servo position information. In the embedded servo system, servo information is arranged reciprocally between data intervals on the magnetic disk surface. Each portion of servo information often includes: a track position information, a track address, and index information, among other items.

The head is positioned at a specific track by using the servo information through two steps known as track seek and track following. The track seek step is performed by moving the magnetic head from the current track to the specific track, and the track following step is performed by precisely following the specific track. Thus, when the magnetic head is positioned on a given track, the track following step enables the magnetic head to follow a central line of the track, and thereby accurately perform a read or write operation.

Conventional means for controlling the position of a magnetic head in a magnetic disk driving device is disclosed in U.S. Pat. No. 5,321,564 entitled *Data Head Offset Detecting Circuit In Magnetic Disk Unit And Magnetic Disk Unit Using Said Data Head Offset Detecting Circuit* issued to Takahashi et at. on 14 Jun. 1994. In Takahashi et at. '564, a data head offset detecting circuit in a magnetic disk unit includes a first offset detector that detects an offset β based on servo information on a data surface read by a data head, a second offset detector that detects an offset γ based on servo information on the data surface read by the data head, and an offset calculator for calculating a real offset α resulting from subtracting offset γ from offset β. While conventional art, such as Takahashi et at. '564, purports to control the position of the magnetic head, I believe that improvements can be contemplated.

SUMMARY OF THE INVENTION

It is therefore an object of the present invention to provide an improved track following method in a magnetic disk driving device.

It is another object to provide a track following method for following an off-track when a data error is generated, thereby reducing the generation of data errors.

It is still another object to provide an on-track offset value adjusting method for determining an averaged on-track offset value in accordance with operational features of the applicable magnetic disk driving device, thereby reducing the generation of data errors.

These and other objects can be achieved according to the principles of the present invention with a track following operation. Under a first embodiment, an on-track offset value is adjusted upwardly and downwardly in an alternating manner, wherein each successive adjustment increases or decreases by a predetermined step value. Under a second embodiment, maximum and minimum values for the on-track offset value are determined by incrementing the on-track offset value upwardly and downwardly, respectively, an average value based on these maximum and minimum on-track offset values is computed, and the average value is designated as an initial on-track offset value.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENTS

Figure 1:
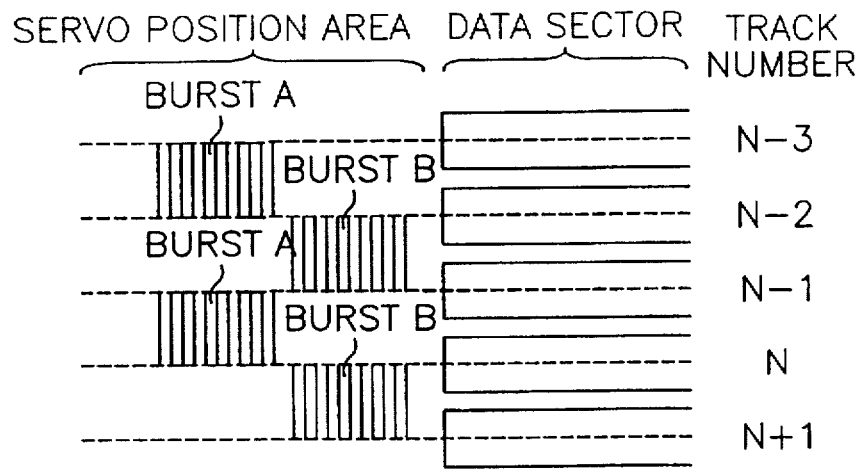
FIG. 1 is a view showing a configuration of a burst signal written on a magnetic disk surface to enable a track following operation in a conventional magnetic disk driving device.
Figure 2A:
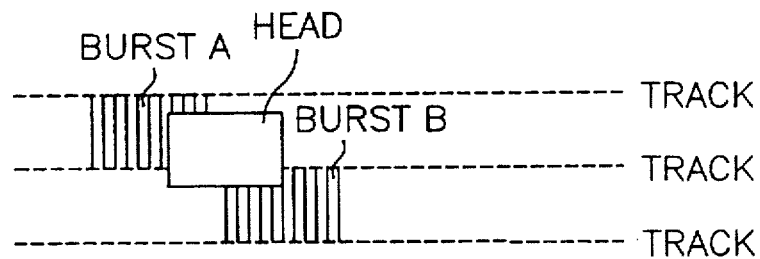
FIGS. 2A to 2C are views showing variations of magnetic head position during the track following operation.
Figure 2B:
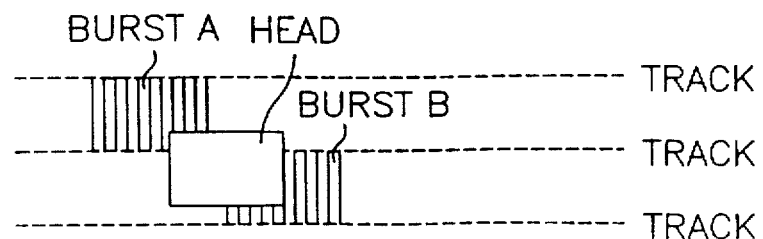
Figure 2C:
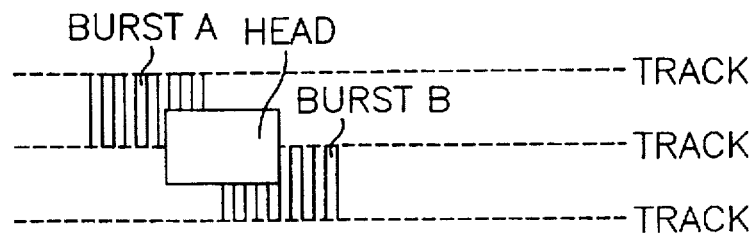

Turning now to the drawings and referring to FIG. 1, a brief description of the conventional magnetic disk driving art utilizing an embedded servo method will be given. In FIG. 1, two bursts A and B per one track are written beforehand as a portion of the servo information on the magnetic disk surface. Bursts A and B are written reciprocally between tracks adjacent to each other, and are detected by the magnetic head. Bursts A and B are respectively written on both sides of a central line of the track, and are written sequentially in a circumferential direction of the track without overlapping each other. If the magnetic head is not disposed at the center of the track and is disposed toward the burst A, as shown in FIG. 2A, a burst A detecting level is greater than a burst B detecting level. On the other hand, if the magnetic head is disposed toward the burst B, as shown in FIG. 2B, the burst A detecting level is less than the burst B detecting level. If, however, the magnetic head is disposed exactly over the center of the track, as shown in FIG. 2C, amplitudes of the bursts A and B detected by the magnetic head are each equal to one half of a maximum detecting level, and a difference between the A burst detecting level and the B burst detecting level is 0. As a result, an amount of deviation and a deviation status representative of the magnetic head's position relative to the center of the track can be determined from the difference value. A signal indicative of the amount of deviation and the deviation status of the magnetic head is typically referred to as a "position error signal" (PES). The position error signal (PES) can be represented by the following expression.

PES=burst A detecting level−burst B detecting level (1)

In expression (1), the value indicated by the position error signal (PES) represents the amount of deviation of the magnetic head, and the sign (=, −, and 0) of the position error signal (PES) value represents the deviation status of the magnetic head. Furthermore, when the position error signal (PES) value is positive (+), the magnetic head is in a state disposed towards burst A. Alternatively, when the position error signal (PES) value is negative (−), the head is in the state disposed towards burst B. Otherwise, when the position error signal (PES) value is 0, the magnetic head is positioned exactly at the center of the track. The magnetic disk driving device controls the magnetic head so that it is capable of following the center of the track by utilizing the position error signal (PES) which has values corresponding to deviations in the position of the magnetic head with respect to the center of the track.

Figure 3:
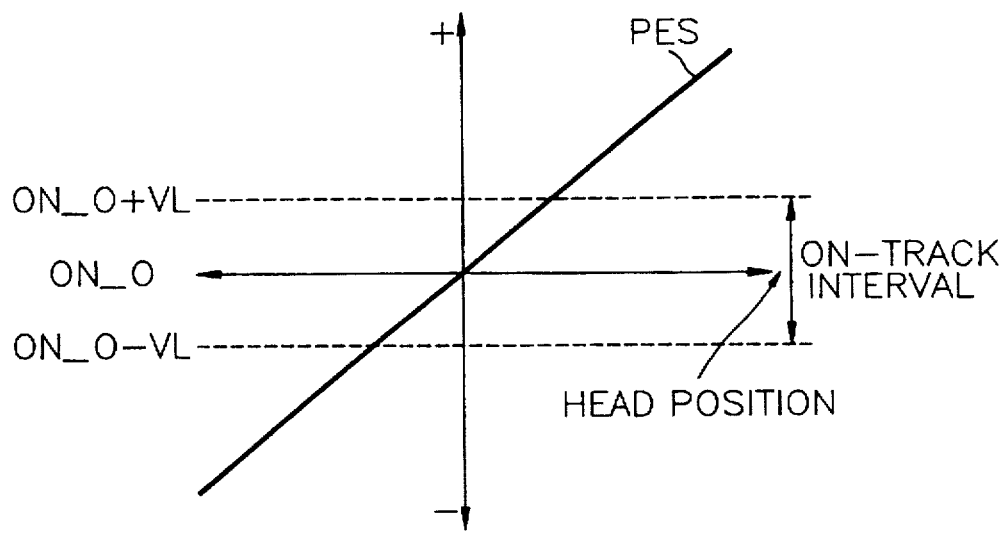
FIG. 3 is a graph showing changes of a position error signal (PES) in accordance with variations of magnetic head position during the track following operation.

The magnetic head is in an "on-track" state when the magnetic head is positioned exactly in the center of the track; that is, when the position error signal (PES) value is 0. During this time, data in a data information interval of the corresponding track can be read/written. Although the on-track status of the magnetic head is preferable, it is almost impossible to maintain the position error signal (PES) value at 0 due to vibrations of the magnetic disk or the head, and device characteristics. Therefore, as shown in FIG. 3, the position error signal (PES) value changes in correspondence with the deviations of the head position and has a minimum value and a maximum value within an on-track interval. That is, the "on track" state of the magnetic head corresponds to the case where the position error signal (PES) value is between the minimum and maximum values. Furthermore, an "off-track" state represents the case where the magnetic head escapes from the on-track interval. In FIG. 3, reference symbol ON_O designates an on-track offset value, ON_O+VL designates an on-track upper limit value (maximum value) that is larger than the on-track offset value ON_O by a value VL, and ON_O−VL designates an on-track lower limit value that is smaller than the on-track offset value ON_O by the value VL. Typically, the on-track offset value ON_O is set to "0" and the value VL is set to an appropriate value derived from test results compiled from various kinds of magnetic disk driving devices.

When the magnetic disk driving device is assembled, the on-track offset value ON_O is preset. Thus, the on-track upper limit value ON_O+VL has a positive sign (+) while the on-track lower limit value ON_O—VL has a negative sign (−). Accordingly, the on-track interval is defined as ON_O±/−VL.

In the magnetic disk driving device, a signal read by the magnetic head is transformed due to various factors, such as the type of magnetic disk, writing density on the disk, position and form of the magnetic head, a signal-to-noise (S/N) ratio of a signal during a read/write operation, signal bandpass, interference, vibrations, etc. In particular, a disk with greater storage capacity typically has a higher density of information written on the disk. Also, the greater the number of tracks is, the smaller the amplitude of the read signal is due to interference between bits, and disturbance of the signal becomes a serious concern. Moreover, on the inner tracks of the magnetic disk, a high degree of writing density is formed. Thus, signal amplification is greatly reduced by disturbances due to duplication and interference between signals.

Accordingly, it is troublesome to precisely maintain the magnetic head in an "on-track" state when accessing data on the magnetic disk surface in the magnetic disk driving device. For this reason, the read/write operations are frequently performed near the upper and/or lower limit lines of the on-track interval (see FIG. 3), and at times, may be performed in an off-track region. In such a case, the signal amplitude of data which has been actually read becomes smaller than that of the noise present, thereby causing the data not to be read or confusing the noise as data.

As described above, there is a problem in that data errors can be generated due to transformations of the signal in accordance with the features and operational status of the magnetic disk driving device.

In the following description of the present invention, several specific details, such as variables and flags, are set forth to provide a more thorough understanding of the present invention. It will be apparent, however, to those skilled in the art that the present invention may be practiced without inclusion of these specific details. Detailed descriptions of well known functions and constructions which may unnecessarily obscure the subject matter of the present invention will therefore be avoided.

Figure 4:
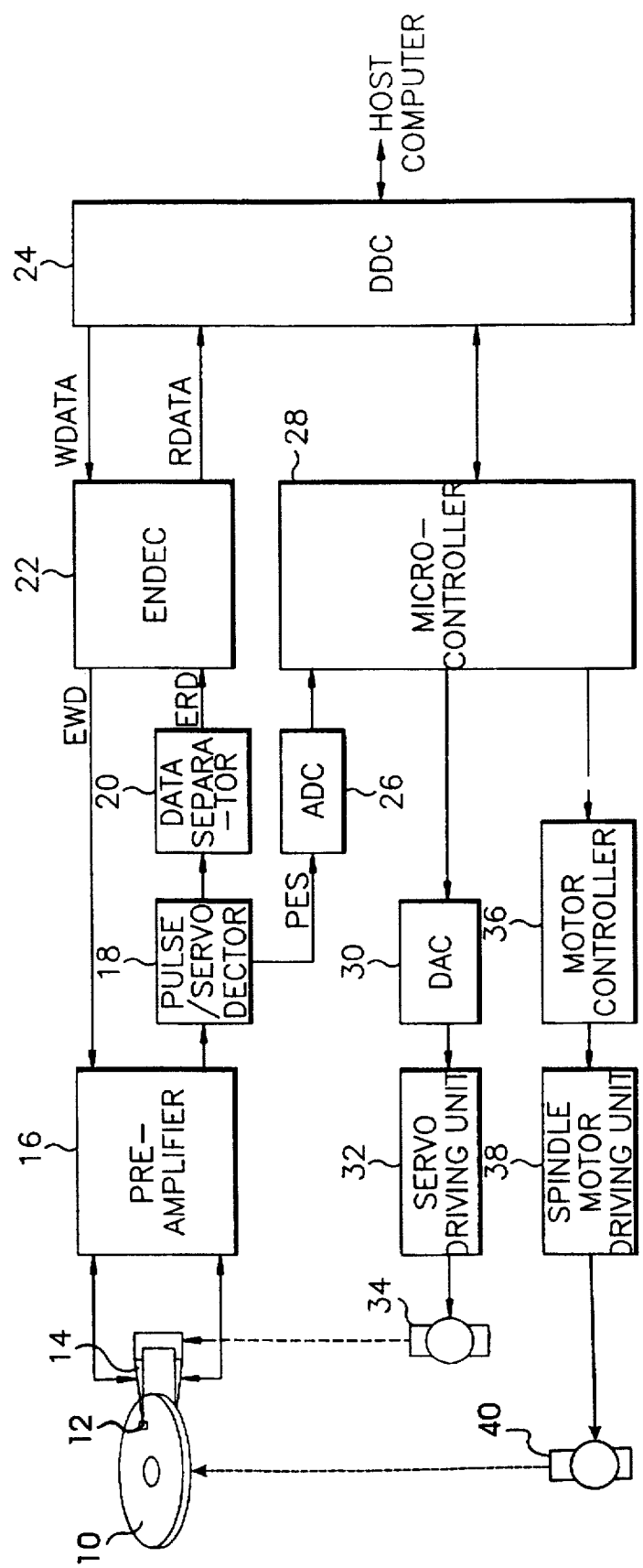
FIG. 4 is a schematic block diagram showing a magnetic disk driving device constructed according to the principles of the present invention.

Referring now to FIG. 4, a schematic block diagram showing a magnetic disk driving device constructed according to the principles of the present invention is shown. In FIG. 4, a magnetic disk 10 is rotated by a spindle motor 40. A magnetic head 12 is positioned on a surface of magnetic disk 10 and is installed at one end of an arm 14 of a rotary voice coil actuator 34. During the read operation, a preamplifier 16 amplifies a signal read by magnetic head 12, and during the write operation, enables the writing of encoded write data (EWD) on the surface of magnetic disk 10 via magnetic head 12. Encoded write data (EWD) is generated and provided from an encoder/decoder 22 (ENDEC). A pulse/servo detector 18 detects an amplified peak value of the signal pre-amplified in preamplifier 16, and thereby generates a data pulse. Thus, pulse/servo detector 18 detects the amplitude of bursts A and B and then generates a signal indicative of the difference between the amplitude levels; that is, pulse/servo detector 18 generates the position error signal (PES). The data pulse generated from pulse/servo detector 18 is provided to a data separator 20 and the position error signal (PES) is provided to an analog-to digital converter 26 (ADC). Analog-to-digital (ADC) 26 converts the position error signal (PES) into a digital step value corresponding its level, and provides the converted value to a micro-controller 28. Data separator 20 separates encoded read data (ERD) which is synchronized with a constant clock from the data pulse generated by pulse/servo detector 18, and then applies the encoded read data (ERD) to encoder/decoder (ENDEC) 22. Encoder/decoder (ENDEC) 22 decodes the encoded read data (ERD) received from data separator 20 and provides the result as read data (RDATA) to a disk data controller 24 (DDC). Encoder/decoder (ENDEC) 22 also encodes written data (WDATA) provided from disk data controller (DDC) 24 and then applies the encoded write data (EWD) to pre-amplifier 16. Disk data controller (DDC) 24 is controlled by microcontroller 28 and writes data received from a host computer on the surface of magnetic disk 10 via encoder/decoder (ENDEC) 22 and pre-amplifier 16. Disk data controller (DDC) 24 also reads data from magnetic disk 10 and transmits the read data (RDATA) to the host computer. Furthermore, disk data controller (DDC) 24 acts as an interface for communication between the host computer and microcontroller 28. Microcontroller 28 controls disk data controller (DDC) 24 and controls track seeking and track following operations, in response to a read/write command received from the host computer. Microcontroller 28 controls the aforementioned track following operation by using the position error signal (PES) value received from analog-to-digital converter (ADC) 26. A digital-to-analog converter (DAC) 30 converts a control value generated from microcontroller 28 to control the position of magnetic head 12 into an analog signal. A servo driving unit 32 generates an electrical current for driving actuator 34 by a signal received from digital-to-analog converter (DAC) 30 and applies the electrical current to the voice coil of actuator 34. Actuator 34 moves magnetic head 12 along the surface of magnetic disk 10 in correspondence with a direction or a level of the electrical current applied from servo driving unit 32. A motor controller 36 controls a spindle motor driving unit 38 in accordance with a control value generated from microcontroller 28 to control the rotation of magnetic disk 10. Spindle motor driving unit 38 drives spindle motor 40 in accordance with the control of motor controller 36 to rotate magnetic disk 10.

In the case that data is written at the upper/lower limit lines in the on-track interval or in the off-track region (see FIG. 3) in the magnetic disk driving device, data errors due to signal variations can be generated. Accordingly, if data is read from the on-track interval, the occurrence of data errors can be reduced. That is, when data is read from an on-track interval of magnetic disk 10, magnetic head 12 follows the track so that the position error signal (PES) value remains relatively constant, thereby reducing data errors.

Figure 5:
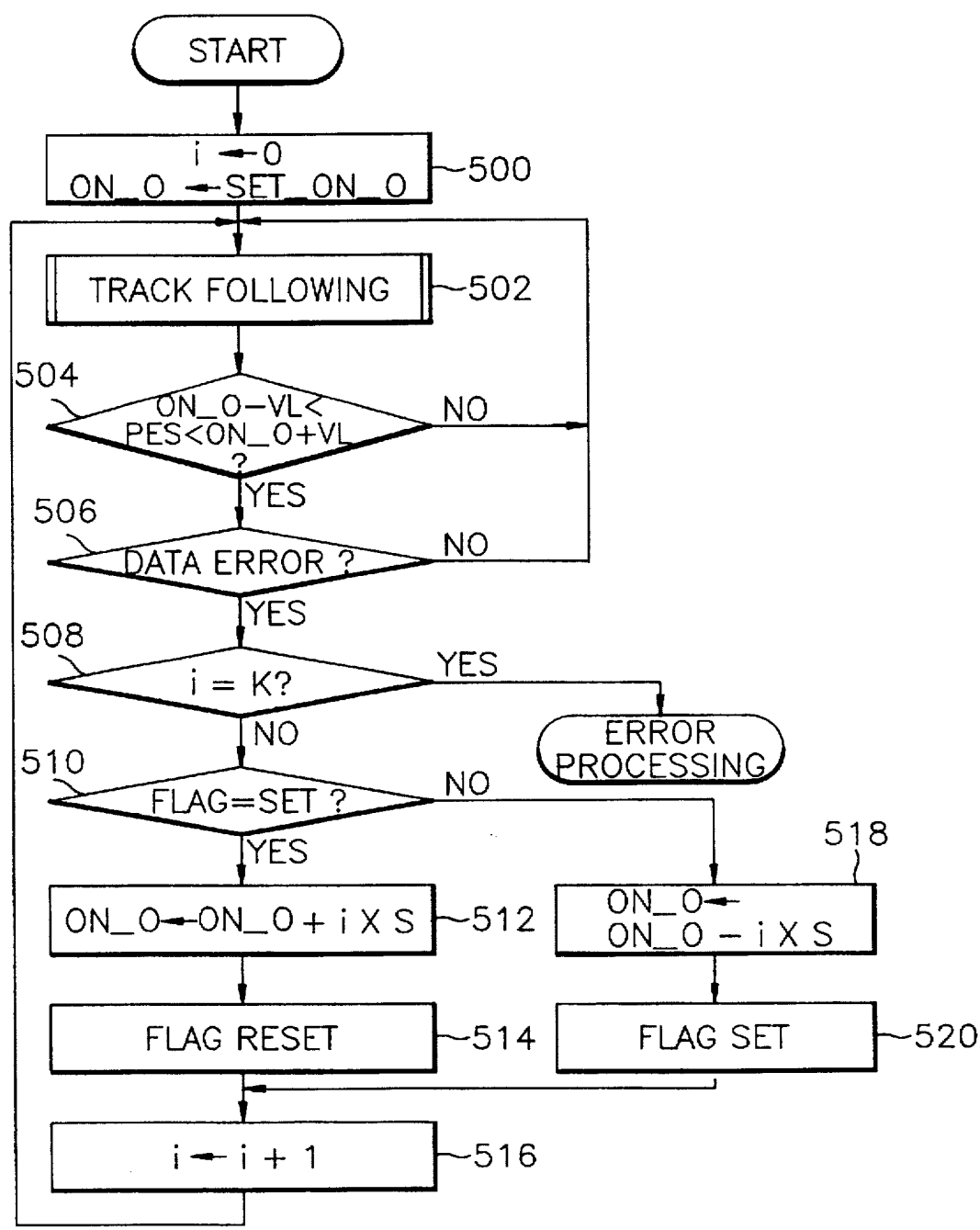
FIG. 5 is a flow chart illustrating a track following operation using an off-track according to the principles of one embodiment of the present invention.

FIG. 5 is a flow chart showing an operation where microcontroller 28 follows a track by adaptively using an off-track in accordance with the operational status or features of a magnetic disk driving device. FIG. 5 depicts a first embodiment of the present invention.

An explanation of the track following operation of the present invention using the off-track will now be given with reference to FIGS. 4 and 5. When data is read from magnetic disk 10, microcontroller 28 seeks a specific track where data is to be read from the surface of magnetic disk 10, moves magnetic head 12 to the specific track, and performs the track following operation in the specific track. In step 500, microcontroller 28 sets a value i to 0 and sets an on-track offset value ON_O to a preset value $SET_{13}$ ON_O. The value i represents the number of times the on-track offset value ON_O is adjusted or changed. The preset value SET_ON_O may be, for example, 0. Next, in step 502, the track following operation in the corresponding track on the surface of magnetic disk 10 is performed. During the track following operation, in step 504, the position error signal (PES) value provided from analog-to-digital converter (ADC) 26 is compared with on-track interval values ON_O±VL, as shown in FIG. 3. When the position error signal (PES) value is smaller than the on-track lower limit value ON_O–VL or larger than the on-track upper limit value ON_O+V, microcontroller 28 determines that the track following operation is not being performed within the on-track interval, and thereby continues to perform the track following operation in step 502. On the other hand, when the position error signal (PES) value is between the on-track lower limit value ON_O–VL and the on-track upper limit value ON_O+VL, microcontroller 28 determines that the track following operation is being performed within the on-track interval, and then checks whether a data error read out from the corresponding track is generated via disk data controller (DDC) 24, in step 506. At this time, when a data error is not generated, it is unnecessary to move magnetic head 12 to the off-track region, and the track following operation is continually performed in step 502. Alternatively, when a data error is generated, steps 508 to 520 are performed to move magnetic head 12 to an arbitrary off-track location by changing the on-track offset value ON_O to an arbitrary value, and the track following operation is continued, in step 502.

In step 508, microcontroller 28 determines whether the value i, representing the number of times the on-track offset value ON_O has been changed or adjusted, equals a pre-set value k. If the value i equals the pre-set value k, error processing is performed. If the value i does not equal the preset value k, microcontroller 28 performs step 510. In step 510, a determination is made as to whether a flag has been set. When the flag has been set, step 512 is performed. Alternatively, when the flag has not been set, step 518 is performed. In step 512, the value i is multiplied by a constant step value S (a natural number), and the multiplied result is added to the current on-track offset value ON_O to generate a new and adjusted on-track offset value ON_O. Consequentially, the on-track offset value ON_O becomes larger. Next, after resetting the flag in step 514, and then increasing the value i by 1 in step 516, the track following operation is resumed, in step 502. In step 518, the value i is multiplied by the constant step value S, and the multiplied result is subtracted from the current on-track offset value ON_O to generate a new and adjusted on-track offset value ON_O. As a result, the on-track offset value ON_O becomes smaller. Then, after setting the flag in step 520, and increasing the value i by 1, the track following operation is resumed, in step 502.

Consequentially, once a data error has been generated when performing the track following operation, the track following operation is performed in different off-tracks, by reciprocally increasing/decreasing the on-track offset value ON_O from a pre-set initial on-track offset value SET_ON_O by a value equal to the constant step value S multiplied by the applicable value of i. The data error is processed, following step 508, only after magnetic head 12 has been moved to an arbitrary off-track a number of times (i.e., the value i) equal to the pre-set value k.

Therefore, in situations where data is written in the upper/lower limit lines in the on-track interval or in an off-track, data can be accurately read by performing the track following operation in the off-track.

Alternatively, if the on-track offset value ON_O is preset to an average value determined in accordance with predetermined features of the individual magnetic disk driving device, rather than initially presetting the on-track offset value ON_O to 0, it is also possible to accurately read data. In such a case, the occurrences of data errors can be greatly reduced, as compared to conventional track following techniques.

Figure 6:
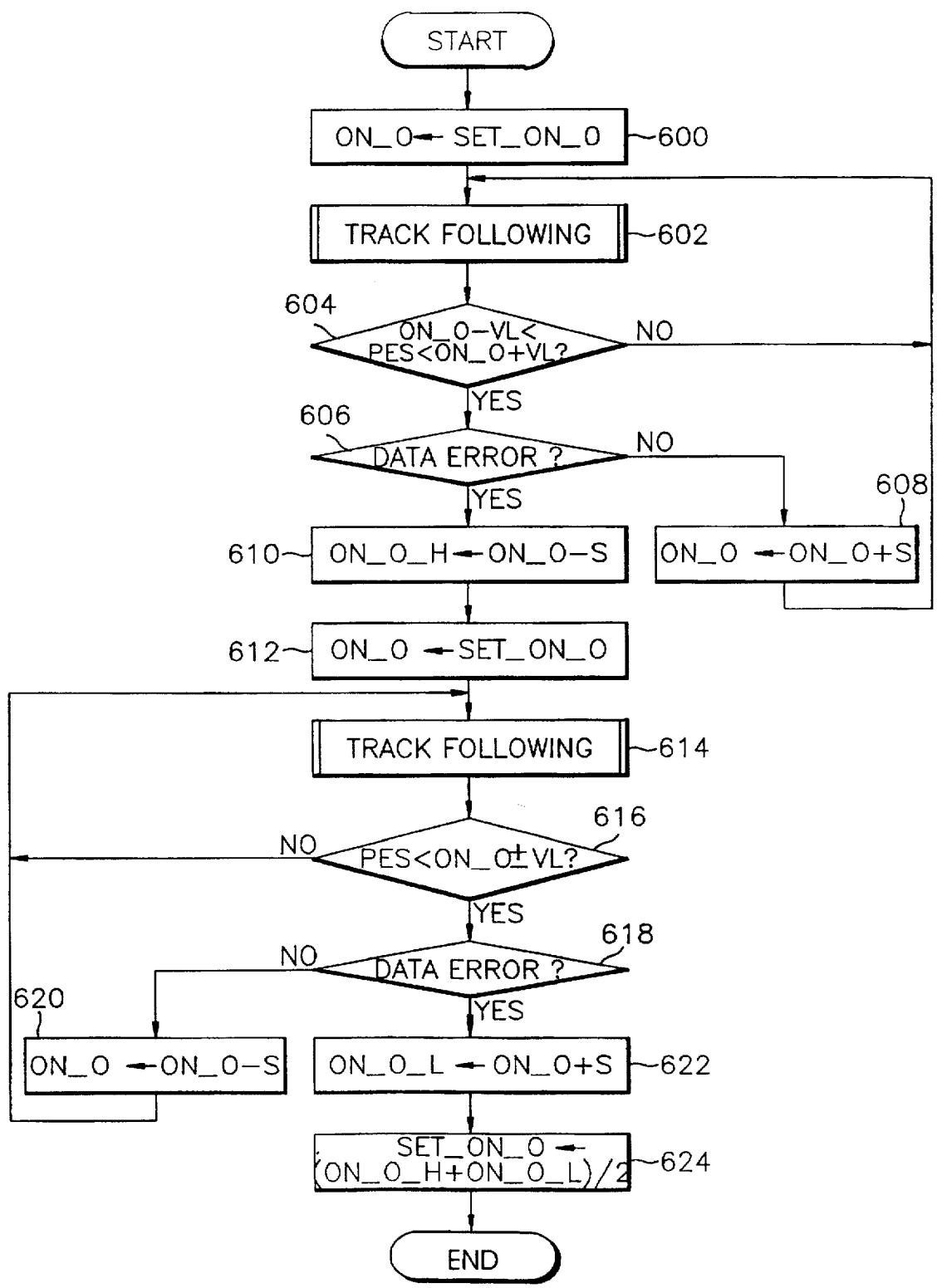
FIG. 6 is a flow chart illustrating an on-track offset value adjustment method performed according to the principles of a second embodiment of the present invention.

FIG. 6 is a flow chart illustrating the operation of microcontroller 28 according to the principles of the present invention, wherein the on-track offset value ON_O is adjusted and preset to an averaged value in accordance with the features of the magnetic disk driving device. FIG. 6 depicts a second embodiment of the present invention.

An explanation of the on-track offset value adjusting operation according to the present invention will now be given in detail with reference to FIGS. 4 and 6. After moving magnetic head 12 to a specific track on the surface of magnetic disk 10 in response to an on-track offset value adjusting command received from the host computer via disk data controller (DDC) 24, microcontroller 28 performs step 600. In step 600, the on-track offset value ON_O is set to an initial on-track offset value SET_ON_O, where the initial on-track offset value SET_ON_O may be, for example, equal to 0. In step 602, the conventional track following operation is performed on a corresponding track on the surface of magnetic disk 10 based on the on-track offset value ON_O. During the track following operation, in step 604, the position error signal (PES) value transmitted via analog-to-digital converter (ADC) 26 is compared with the on-track interval values ON_O±VL depicted in FIG. 3. When the position error signal (PES) value is smaller than the on-track lower limit value ON_O–VL or larger than the on-track upper limit value ON_O+VL, microcontroller 28 determines that the track following is not being performed in the on-track interval, and thereby continually performs the track following operation in step 602. On the other hand, if the position error signal (PES) value is between the on-track lower limit value ON_O–VL and the on-track upper limit value ON_O+VL, microcontroller 28 determines that the track following operation is being performed in the on-track interval, and advances to step 606. In step 606, a determination is made as to whether a data error read out from the corresponding track is generated via disk data controller (DDC) 24. When the data error is not generated, the on-track offset value ON_O is increased by the constant step value S in step 608, and the track following operation is continually performed in step 602. By continually incrementing the on-track offset value ON_O upwardly by the constant step value S, a data error is eventually generated. Once the data error is generated, step 610 is performed where the current on-track offset value ON_O is reduced by the constant step value S, and this resulting value is designated as a maximum on-track offset value ON_O_H.

Next, after setting the on-track offset value ON_O to the initial on-track offset value SET_ON_O in step 612, the conventional track following operation on a corresponding track on the surface of magnetic disk 10 is performed based on the on-track offset value ON_O, in step 614. During the track following operation, the position error signal (PES) value received via analog-to-digital converter (ADC) 26 is compared with the on-track interval values ON_O±VL depicted in FIG. 3 in step 616. When the position error signal (PES) value is smaller than the on-track lower limit value ON_O–VL or larger than the on-track upper limit value ON_O+VL, microcontroller 28 determines that the track following operation is not being performed within the on-track interval, and thereby continues to perform the track following operation, in step 614. On the other hand, when the position error signal (PES) value is between the on-track lower limit value ON_O–VL and the on-track upper limit value ON_O+VL, microcontroller 28 determines that the track following operation is being performed within the on-track interval, and then determines whether a data error read from the corresponding track is generated via disk data controller (DDC) 24, in step 618. By continually incrementing the on-track offset value ON_O downwardly by the constant step value S in step 620, a data error is eventually generated. Once the data error is generated, step 622 is performed where the current on-track offset value ON_O is increased by the constant step value S, and this resulting value is designated as a minimum on-track offset value ON_O_L.

Then, in step 624, microcontroller 28 averages the maximum on-track offset value ON_O_H and the minimum on-track offset value ON_O_L determined as described above and sets an averaged value to the initial on-track offset value SET_ON_O.

According to the method depicted in FIG. 6, microcontroller 28 determines maximum and minimum values for the on-track offset value by incrementing the on-track offset value upwardly and downwardly, respectively, computes an average value based on these maximum and minimum on-track offset values, and designates the average value as the initial on-track offset value. Accordingly, the initial on-track offset value is determined in accordance with operational features of the individual magnetic disk driving device.

As mentioned above, the present invention possesses advantages in that the occurrence of data errors can be greatly reduced in the performance of a track following operation.

While there have been illustrated and described what are considered to be preferred embodiments of the present invention, it will be understood by those skilled in the art that various changes and modifications, such as a dedicated servo system and a hybrid servo system, may be made, and equivalents may be substituted for elements thereof without departing from the true scope of the present invention. In addition, many widely different embodiments of the present invention may be utilized in the pick-up position control of the magnetic disk driving device. Therefore, it is intended that the present invention not be limited to the particular embodiments disclosed as the best mode contemplated for carrying out the present invention, but that the present invention includes all embodiments falling within the scope of the appended claims.

What is claimed is:

1. A track following method in a magnetic disk drive device, comprising the steps of:

performing an on-track following operation by enabling a magnetic head to follow a path using a specific track of a surface of a magnetic disk in dependence upon an offset value indicative of a spacial deviation between said magnetic head and a center line of said specific track;

determining whether a data error is detected while performing said on-track following operation;

when said data error is detected, moving said magnetic head from a current position on top of said surface of said magnetic disk to a new position on top of said surface of said magnetic disk by adjusting said offset value in one of an upward direction and a downward direction, said offset value being alternately adjusted in the upward and downward directions by a quantity equal to a predetermined step value multiplied by a number of times said offset value has been previously adjusted; and when said data error is not detected, continuing said on-track following operation by enabling said magnetic head to follow said path formed by said specific path on said surface of said magnetic disk.

2. The method as claimed in claim 1, wherein said offset value is adjusted in said downward direction during a first adjustment of said offset value and said offset value is adjusted in said upward direction during a second adjustment of said offset value occurring subsequent in time to said first adjustment.

3. The method as claimed in claim 2, wherein a first magnitude of said first adjustment is less than a second magnitude of said second adjustment.

4. The method as claimed in claim 3, wherein said second magnitude is an integer multiple times greater than said first magnitude.

5. The method as claimed in claim 1, further comprising a step of:

when said data error is detected, processing said data error after said offset value has been adjusted a predetermined number of times.

6. A track following method in a magnetic disk drive device, said method comprising the steps of:

performing an on-track following operation by enabling a magnetic head to follow a path formed by a specific track on a surface of a magnetic disk in dependence upon an offset value representative of a spacial deviation between said magnetic head and a center line of said specific track;

determining whether a data error is detected while performing said on-track following operation;

when said data error is detected, moving said magnetic head from a current position to a new position on said surface of said magnetic disk by adjusting said offset value in one of an upward direction and a downward direction, said offset value being adjusted by a quantity equal to a predetermined step value multiplied by a number of times said offset value has been previously adjusted; and when said data error is not detected, continuing said on-track following operation by enabling said magnetic head to follow said path formed by said specific path on said surface of said magnetic disk.

7. The method as claimed in claim 6, further comprising a step of:

when said data error is detected, processing said data error after said offset value has been adjusted a predetermined number of times.

8. The method as claimed in claim 6, wherein said offset value is adjusted in said downward direction during a first adjustment of said offset value and said offset value is adjusted in said upward direction during a second adjustment of said offset value occurring subsequent in time to said first adjustment.

9. The method as claimed in claim 6, wherein said offset value is adjusted in said upward direction when said number of times said offset value has been previously adjusted equals an odd number, and said offset value is adjusted in said downward direction when said number of times said offset value has been previously adjusted equals an even number.

10. A track following method in a magnetic disk drive device, said method comprising the steps of:

performing a track following operation by enabling a magnetic head to follow a path formed by a specific track on a surface of a magnetic disk in dependence upon an offset value representative of a special deviation between said magnetic head and a center line of said specific track;

repeatedly increasing said offset value from an initial value by a constant step value until a data error is detected while performing said track following operation;

when said data error is detected, decreasing said offset value from a first current offset value by said constant step value to generate a maximum offset value;

resetting said offset value to said initial value and resuming performance of said track following operation;

repeatedly decreasing said offset value from said initial value by said constant step value until said data error is detected while performing said track following operation;

when said data error is detected, increasing said offset value from a second current offset value by said constant step value to generate a minimum offset value; and computing an average value representative of an average between said maximum offset value and said minimum offset value.

11. The method as claimed in claim 10, further comprising a step of designating said average value as a new initial value for said offset value.

12. A track following method in a magnetic disk drive device, said method comprising the steps of:

performing a track following operation by enabling a magnetic head to follow a path formed by a specific track on a surface of a magnetic disk in dependence upon an offset value indicative of a special deviation between the magnetic head and a center line of the specific track;

repeatedly adjusting a magnitude of the offset value in a first direction by a constant step value until a data error is detected while performing the track following operation;

when the data error is detected, adjusting the magnitude of the offset value in a second direction by the constant step value to generate a first calculated offset value;

after generating the first calculated offset value, resetting the offset value to an initial value and resuming performance of the track following operation;

repeatedly adjusting the magnitude of the offset value in the second direction by the constant step value until the data error is detected while performing the track following operation;

when the data error is detected, adjusting the magnitude of the offset value in the first direction by the constant step value to generate a second calculated offset value; and generating an average value representative of an average of the first calculated offset value and the second calculated offset value.

13. The method as claimed in claim 12, further comprising a step of designating the average value to be reset as said initial value for the offset value.

* * * * *